Oct. 26, 1965   MINORU MASUDA   3,213,543
DUST PROTECTION FOR MICRO-CALIPERS WITH A DIAL GAGE
Filed Dec. 17, 1963
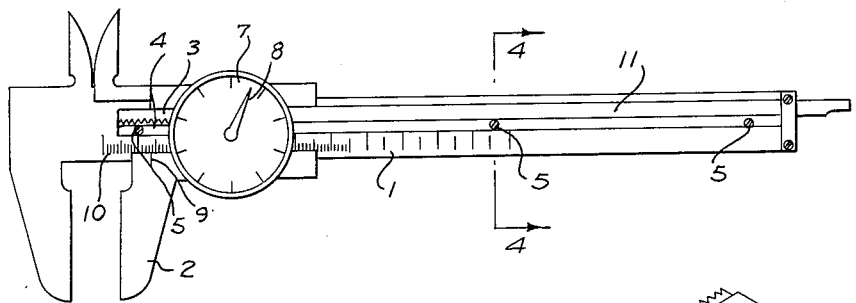
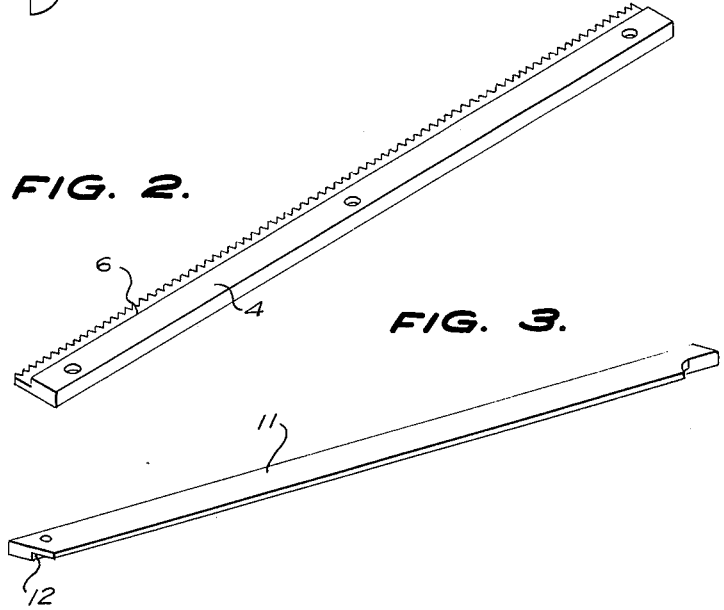
INVENTOR.
MINORU MASUDA
BY
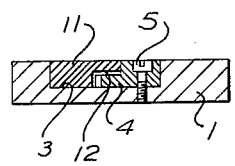
ATTORNEYS.

3,213,543
DUST PROTECTION FOR MICRO-CALIPERS WITH A DIAL GAGE
Minoru Masuda, 2200 Shimogurimachi,
Utsunomiya-shi, Japan
Filed Dec. 17, 1963, Ser. No. 331,309
Claims priority, application Japan, Apr. 3, 1963,
38/18,150
1 Claim. (Cl. 33—147)

The present invention relates to the dust protection cover for the rack engaging with the pinion of the dial gage in a micro-calipers with a dial gage.

It has already been proposed to attach a dial gage to a micro-calipers and make the said dial gage perform the function of a vernier, namely, to indicate finer dimensions. In a micro-calipers of such type a rack is provided in the groove of the main beam, and a pinion projecting from the back side of a dial gage fitted on the sliding mount moving along the said main beam is engaged with the said rack; when the said sliding mount moves along the said main beam, the pinion engaging with the rack is rotated, thereby turning the rotating pointer of the said dial gage.

In the conventional micro-calipers with a dial gage, dust tends to clog the teeth of the rack provided within the groove of the main beam, thereby hampering a smooth motion of the sliding mount along the main beam or causing a wear of the teeth of pinion and rack, which results in bad meshing of rack with pinion.

The object of the present invention is to protect the rack teeth from dust infiltration by cutting and L-groove at an edge of the back side of the depth bar which is consolidated with the sliding amount in such manner that the said L-groove may cover the rack teeth provided on the main beam.

The following is an explanation of an example of application of the present invention with reference to the attached drawing, in which FIGURE 1 is a front view of the new micro-calipers;

FIGURE 2 is a perspective view of the rack fitted to the main beam;

FIGURE 3 is a perspective view of the depth bar consolidated with the sliding mount;

FIGURE 4 is an enlarged section of FIGURE 1 along IV—IV.

Just like in a common micro-calipers, a sliding mount 2 moves along the main beam 1. The said main beam 1 is provided with a groove 3, within which a rack 4 is fastened to the main beam 1 with a plurality of screws 5. The said rack 4 is designed less thick at the teeth than at the base, so that a step 6 is formed from base to teeth (FIG. 2).

A dial gage 7 is attached on the surface of the sliding mount 2; and a pinion projecting from the back side of the said dial gage 7 engages with the rack 4 (not shown). Therefore, when the sliding mount 2 is shifted along the main beam 1, the said pinion projecting from the back side of the dial gage 7 attached on the sliding mount 2 is made to rotate by the rack 4 which is fastened to the main beam 1, thereby turning the rotating pointer 8 on the face of the dial gage.

To measure the length by this micro-calipers, you read where the reference line 9 marked on the sliding mount 2 meets the graduation 10 on the main beam 1. A fraction of one degree of the graduation 10 is indicated by the pointer 8 of the dial gage 7. Thus the said dial gage performs the function of a venier.

Also just like in the common micro-calipers, the sliding mount 2 is consolidated with a depth bar 11, the back side edge of which facing the rack teeth 6 is provided with an L-groove 12, which covers the teeth of the rack 4.

The said depth bar 11 is consolidated with the sliding mount 2, so that when the said sliding mount 2 is shifted along the main beam 1, the said depth bar 11 moves together with the sliding mount 2 along the groove 3 of the main beam 1. In the portion of the micro-calipers which is held by the hand, the depth bar 11 always is covering the rack 4; thus dust is always kept from the teeth of the rack 4.

What is claimed is:

An improvement in micro-calipers comprising a main beam having a longitudinal recess, a mount slidably mounted on said main beam, a dial gage carried by said mount, a rack bar fixedly mounted on said main beam recess and having a toothed marginal portion of reduced thickness, a depth bar attached to said mount and slidably mounted in and extending longitudinally of said main beam recess and said depth bar slidably mounted on said main beam and having a marginal portion of decreased thickness positioned over said rack bar toothed marginal portion covering the teeth thereof against the admission of dust to said teeth.

References Cited by the Examiner
UNITED STATES PATENTS 2,034,804   3/36   Gamroth _____ 33—147
2,898,684   8/59   Schneider _____ 33—147

ISAAC LISANN, *Primary Examiner.*